June 10, 1969  K. R. SHELLENE ET AL  3,448,944

FINNED CAPSULES

Filed March 30, 1967

INVENTORS:
K. R. SHELLENE
PAUL T. CHU
BY: *W. E. Marconett*
THEIR ATTORNEY

United States Patent Office 3,448,944
Patented June 10, 1969

3,448,944
FINNED CAPSULES
Kent R. Shelllene, Houston, Tex., and Paul T. Chu, Peekskill, N.Y., assignors to Shell Oil Company, New York, N.Y., a corporation of Delaware
Filed Mar. 30, 1967, Ser. No. 627,163
Int. Cl. B65g *51/04*
U.S. Cl. 243—32
10 Claims

ABSTRACT OF THE DISCLOSURE

Articles may be transported cross-country through large-diameter pipelines carrying a fluid flow stream by enclosing the articles in a capsule. The capsule is centered within the pipeline bore by radially extending fins and is swept axially therethrough by the flow stream fluid.

---

This invention relates to a method and apparatus for transporting articles through a fluid-conducting pipeline. More specifically, this invention pertains to articles contained by or in the form of capsules which may be transported through a pipeline along with a fluid medium carried by said pipeline.

The transportation of solid articles or capsules by pipelines provides a new means for long distance solids handling. Pipeline transportable materials may either be molded or contained in hollow capsules, thereby applying the concept to a large variety of commodities. Typical examples are sulfur and wheat. Laboratory experience has shown the possibility of pumping up to 81% pipeline volume of solid in capsule form. The economy of this means of transportation remains attractive even when the cost of necessary solid processing is included. Nothing prevents one from filling successive capsules with different materials; thus a multi-commodity solids pipeline should be feasible utilizing the capsule pipeline technique. Furthermore, the overall economic picture may be additionally improved if a marketable liquid is used to propel the solid capulses.

Although the basic concept of transporting solid particles through a pipeline is, per se, old in the art, such as the vacuum lines used in department stores, such prior art systems have not been economical or practical when applied to a long distance, cross-country pipeline due to excessive power requirements and their propensity to jam. The department store type system uses a piston-type capsule to carry the desired commodities which almost fills the cross-sectional bore of the pipeline. This is necessary in order to generate sufficient pressure differential between the opposing piston faces to move the capsule and to stabilize the capsule within the pipe bore to prevent jamming by wedging. Of course, the full peripheral contact between the capsule piston circumference and the pipe bore merely increased the necessary motivating pressure differential across the piston, thereby increasing the power requirements for the system and consequently decreasing the efficiency thereof. In a small system, such as for a department store, the absolute value of such inefficiency is outweighed by the convenience of the system.

Although it might appear obvious to make the capsules substantially smaller in cross-sectional area than that of the pipe bore to decrease the frictional forces between said capsule and said bore, further thought would lead one to the conclusion that the jamming propensity due to wedging would be aggravated thereby.

Of course, one might conclude that jamming by wedging may be prevented by making the capsules longer, thereby increasing the length-diameter ratio. However, this solution raises the additional problem of the inability of long capsules to pass relatively small radius bends in the pipeline.

Hence, it is an object of this invention to provide a capsule for solid article transport through a fluid carrying pipeline that is both economical to operate and relatively free from jamming due to wedging.

Another object of this invention is to minimize the drag between a pipe wall and a capsule transportable therethrough.

Still another object of this invention is to insure streamlined center flow of a capsule transportable through a pipeline.

A further object of this invention is the stabilization of carrier fluid past a capsule that is transportable through a fluid pipeline.

An additional object of this invention is to provide a capsule for economical transport through a fluid pipeline having a small cross-sectional area than the internal bore of said pipeline.

These and other objects will become evident from the following description of the drawings wherein.

Figure 1:
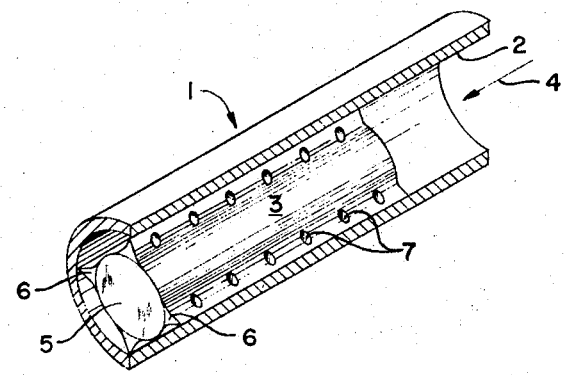
FIGURE 1 is a perspective view of a partial cross-section of a pipeline having a transport capsule constructed according to the present invention container therein.

With reference to FIGURE 1, there is shown a partial section of a pipeline 1 having a relatively smooth bore 2 of substantially constant cross-sectional area. Transported within the pipeline 1 is some carrier fluid having a flow direction indicated by the arrow 4. Typical of such fluids are natural gas, crude petroleum or solid-liquid slurries. Slidably disposed within the pipeline bore 2 is a transportable article or capsule 3. The capsule 3 is comprised of a sylindrical body 5 having circumferentially spaced fins 6 either secured thereto or integral therewith. The extreme ends of the fins 6, which constitute points in a plane transverse to the axis of said capsule and pipe bore, are on and therefore define the length of a peripheral line that is symmetric with the transverse periphery of the pipe bore and substantially equal thereto. Such a line may be circular, triangular, rectangular or ellipical, depending on the cross-sectional shape of the pipe bore. Preferably, the length of said line is slightly less than the periphery of said pipe bore. The height of the fins 6 from the central axis of capsule body 5 is usually such as to keep the body coaxially centered in the pipeline 2. Whether this will be the case in a specific application is determined by the flow characteristics of a particular carrier fluid in a particular pipeline, particularly, the cross-sectional velocity flow pattern. Generally, however, the line of maximum fluid flow velocity should pass through the cross-section center of the capsule. In the case of a pipeline having a circular cross-sectional bore that is completely filled with a simple fluid such as water, the pipeline axis and the capsule axis through the cross-sectional center thereof would be coaxial. For other pipeline bore shapes or more complex fluids, such as liquid-solid slurries, the respective axes of the pipeline and the capsule may not be coaxial.

The fins 6 on the capsule 5 are preferably tapered for maximum strength in the region immediately adjacent the capsule body 5 and for minimum contact area with the bore 2 at their outer extremities. Also, the fins should extend longitudinally along the capsule and parallel with the pipeline axis. Such alignment is necessary for streamlined fluid flow past the capsule and for the prevention or stabilization of rotary motion of the capsule within the pipeline bore 2 about the axis thereof.

Fins 6 are also provided with a plurality of equalization ports or flow passages 7 distributed along the length thereof, which, in the case of the FIGURE 1 embodiment, are apertures extending transversely through said fins. Such passages are neccesary to minimize the forces due to crossflow. The minimization of such forces tends to stabilize any rotary motion of the capsule resulting from same.

Figures 2, 4:
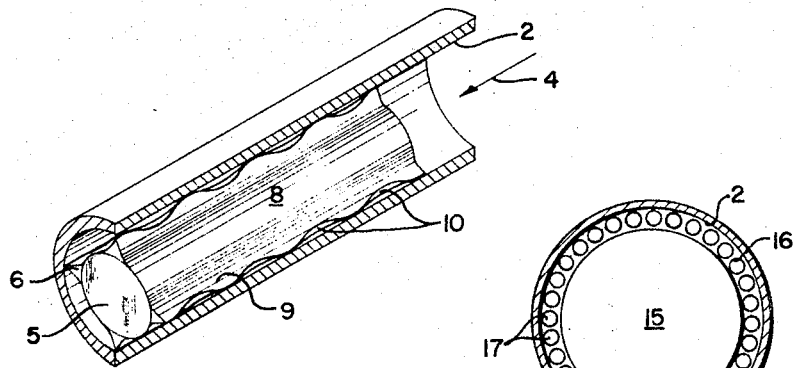
FIGURE 2 is a perspective view of a pipeline having another embodiment of the capsule contained therein.
FIGURE 4 is an orthographic cross-sectional view of a pipeline having a capsule disposed therein according to the invention with a modified fin design.

Cross-flow passages for the capsule fins may also take the form of notches or scallops 10 as seen on the extreme edge of fins 9 on the capsule 8 embodiment of FIGURE 2.

Figure 3:
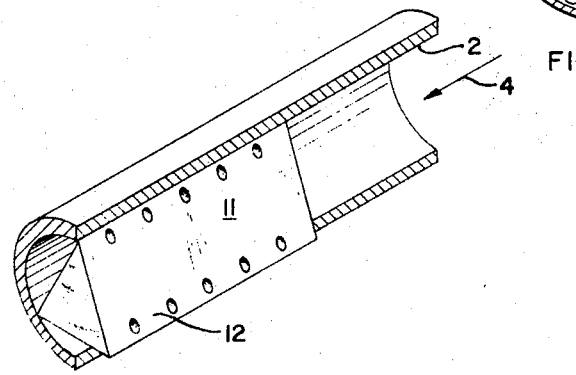
FIGURE 3 is a perspective view of the invention having a capsule with a modified cross-section.

The cross-sectional shape of the capsule may take forms other than that of the substantially cylindrical body 5 shown in FIGURE 1. For example, the capsule may be cross-sectionally formed in the shape of a triangle 11 as shown in FIGURE 3 with the longitudinal extension of the triangle apices constituting the fins 12. The embodiment of FIGURE 3 is representative of any regular polygonal cross-section structure such as a square, pentagon, hexagon, etc., which may also be used.

The entire cross-sectional area of the capsules, predominantly that of the body 5, is sized so that a sufficient quantity of carrier fluid may past any capsule brought to a halt within the flow stream to carry the downstream capsules on to their destination. Another criterion to be considered in the sizing of the capsule 3 relative to the pipeline bore 2 is the effect of pipeline overpressurization by a fluid carrier medium that is energized by a positive displacement, e.g., reciprocating, pump. It has been determined experimentally that the cross-sectional area of the capsule should approximate 90% of the pipe bore cross-sectional area. Although the invention will function either above or below this percentage figure, efficiency of operation may be sacrificed thereby.

The length of the capsule 3, beyond a minimum length of slightly longer than the pipe bore 3 diameter to prevent wedging, is dictated by the practicalities of convenience for handling, loading and the minimum radius of any pipeline bends that must be negotiated by a stiff or relatively inflexible capsule.

The structure of a capsule, as opposed to the superficial shape described above, may be that of a rigid, hollow shell, i.e., metal, having closed ends and is not collapsible when emptied of the commodity it is intended to carry. Another form of rigid capsule may be one that is entirely molded from the material to be transported such as sulfur and has no outer shell associated with it. On the other hand, the capsule may be fashioned as a sealable container from a relatively soft and flexible material such as polyethylene or polypropylene. Sufficient rigidity for transport would be acquired by filling such a flexible capsule with the commodity intended for transport. In any event, the capsule, when placed in the flow stream, should be sufficiently rigid to prevent the capsule from filling the pipeline bore cross-section in case the capsule becomes compressed while moving therethrough.

In operation, a capsule may be loaded into the pipeline fluid flow stream by any of many known means such as a pressure lock chamber having a discharge conduit intersecting tangentially with the main pipeline 1. For most efficient operation, the capsule should have a relative specific gravity equal to that of the carrier fluid so there will be no normal friction load between the fins 6 and the pipe bore 2 due to gravity. Although such a relative specific gravity is preferred for the reason stated, it is pointed out that this is not practiced at all times. Hence, a greater relative specific gravity is contemplated along with the consequent additional power requirement to move the capsule. As pointed out previously, the capsule is not a free piston and is not driven through the pipeline by a mere pressure differential across the piston faces as in the case of the prior art. To the contrary, the capsule of this invention is driven through the pipeline by the surface friction drag forces between the carrier fluid and the circumferential surface skin of the capsule resulting from a slight velocity differential between the capsule and the carrier fluid. More specifically, the capsule being centered in the flow stream by the fins is acted upon by the cross-sectionally centered region of the flow stream which has a greater velocity than the net flow velocity of the pipeline fluid considered as a whole. The standard parabolic velocity profile curve for fluids flowing in pipelines will illustrate this fact. Hence, it is possible for the capsule to flow through the pipeline at a greater velocity than the net flow velocity of the flow stream. The velocity differential between the capsule and the flow stream required to overcome the drag imposed on the fins and to propel the capsule is relative to the faster, center region flow streams and not to net flow velocity of the whole cross-section. It should therefore be understood that if the cross-sectional area of the capsule is increased to approach the internal cross-sectional bore of the pipeline, the capsule velocity will decrease and approach the net flow stream velocity.

Still another embodiment of the invention is as illustrated at FIGURE 4 which shows a capsule 15 having at least two transverse centering fins or rings 16. The outside diameter of the fins 16 is substantially equal to the internal diameter of the pipeline bore 2. In thickness, the fins 16 are very narrow and may be in the order of ¼ inch, depending on the size of the pipe bore and the size and weight of the capsule. To streamline the passage of the slow moving portion of the flow stream adjacent the pipe bore 2, a plurality of apertures 17 through the fin 16 are provided around the annular ring section thereof. Although this embodiment of the invention has a relatively high surface friction between the outer edges of the fins 16 and pipe bore wall 2 as compared to the longitudinal fin embodiments of FIGURES 1 through 3, it is relatively inexpensive to manufacture, being fabricated as a ring section from common plate material, drilled with an appropriate number and size of apertures 17 and simply attached to a cylindrical capsule 15 such as a standard steel drum.

We claim:
1. Apparatus for the transport of an article through a pipeline conduit, said apparatus comprising:
   a pipeline conduit of substantially uniform cross-sectional bore;
   a fluid substance for transport through said conduit; and
   an elongated article of substantially uniform cross-section and greater length than width between cross-sectional extremities, said article being longitudinally disposed within said conduit bore, the cross-sectional area of said article being less than the bore of said conduit whereby said fluid will readily flow through said bore past said article, said article having at least three longitudinally extending fins circumferentially spaced about the periphery of said article and extending along the length thereof, the extremities of said fins defining a periphery in a plane transverse to the length of said article substantially equal to the periphery of said bore, said edges having fluid passage means extending across the width thereof in close proximity with said extremities.
2. The apparatus of claim 1 wherein said fluid passage means are apertures extending transversely through said edges.
3. The apparatus of claim 1 wherein said fluid passage means are notches transversely extending across the extremity of said edges.
4. The apparatus of claim 1 wherein the cross-section of said article is in the shape of a polygon.
5. The apparatus of claim 1 wherein said article comprises a substantially cylindrical body and said edges are fins secured to said body.
6. The apparatus of claim 1 wherein said article is a hollow shell adapted to contain a transportable commodity.

7. The apparatus of claim 1 wherein said article is cast of a substance that is substantially inert to said fluid.

8. The apparatus of claim 1 wherein said cross-sectional area of said article is approximately 90 percent of the cross-sectional area of said bore.

9. Apparatus for the transport of an article through a pipeline conduit, said apparatus comprising:
   a pipeline conduit of substantially uniform cross-sectional bore;
   a fluid substance for transport through said conduit;
   an elongated article having a substantially uniform mean diameter and a greater length than said mean diameter, the cross-sectional area of said article being less than said cross-sectional bore of said pipeline conduit; and
   fin means secured to said article and circumferentially spaced about the periphery of said article, said fin means extending radially from said article to substantially center said article longitudinally within the bore of said conduit, said fin means having fluid flow passage means therein substantially parallel to the direction of flow of said fluid within said conduit so as to permit axial passage of said fluid between the radially outer periphery of said article and the wall of said pipeline conduit bore past said article.

10. The apparatus of claim 9 wherein said fin means are thin ring sections secured to said article in a transverse plane to the axis of said pipeline and said fluid passage means are apertures in said ring sections.

References Cited

UNITED STATES PATENTS

| 723,457 | 3/1903 | Gipe | 243—39 |
| 3,248,071 | 4/1966 | Cook | 243—32 |

EDWARD A. SROKA, *Primary Examiner.*

H. C. HORNSBY, *Assistant Examiner.*

U.S. Cl. X.R.

243—39